US007334785B2

(12) United States Patent
Bortoli

(10) Patent No.: US 7,334,785 B2
(45) Date of Patent: Feb. 26, 2008

(54) LOCKING VISE FOR PIPES

(75) Inventor: Renzo Bortoli, Torreglia (IT)

(73) Assignee: RITMO S.p.A., Teolo (IT)

( * ) Notice: Subject to any disclaimer, the term of this patent is extended or adjusted under 35 U.S.C. 154(b) by 0 days.

(21) Appl. No.: 11/473,076

(22) Filed: Jun. 23, 2006

(65) Prior Publication Data

US 2007/0013117 A1 Jan. 18, 2007

(30) Foreign Application Priority Data

Jul. 12, 2005 (IT) .......................... PD2005A0216

(51) Int. Cl.
*B23Q 3/00* (2006.01)

(52) U.S. Cl. ...................................................... 269/287

(58) Field of Classification Search ................ 269/287, 269/71, 43, 73; 29/243.55, 243.56
See application file for complete search history.

(56) References Cited

U.S. PATENT DOCUMENTS 2,308,340 A * 1/1943 Newlon ...................... 269/189
2,800,867 A * 7/1957 Smith ......................... 269/189
3,982,739 A * 9/1976 Maes .......................... 269/37
4,575,061 A * 3/1986 Dille ........................... 269/44
6,099,058 A * 8/2000 Asai et al. ............... 294/103.1

* cited by examiner

*Primary Examiner*—Lee D. Wilson
(74) *Attorney, Agent, or Firm*—Modiano & Associati; Albert Josif; Daniel J. O'Byrne

(57) ABSTRACT

A locking vise for pipes, useful in operations for welding portions of plastic pipe by polywelding of the head portion. The vise comprises two mutually opposite jaws which form, when clamped, a circular locking seat for a portion of pipe. A slot is formed on the grip surface of each jaw in order to accommodate a corresponding portion of a body for reducing the diameter of the circular locking seat of the pipes. Elements for fixing to the corresponding jaw are further associated with each reduction body. The fixing elements comprise at least one locking pin, which can perform an axial translational motion and is inserted through the slot transversely to the slot. The locking pin has, in the axial direction, a first part, which forms, when arranged in the slot, an undercut for preventing extraction for the reduction body, and a second part, which is recessed with respect to the first part and forms, when arranged in the slot, a disengagement configuration for the reduction body.

6 Claims, 3 Drawing Sheets

LOCKING VISE FOR PIPES

The present invention relates to a locking vise for pipes, useful particularly but not exclusively in operations for welding portions of plastic pipe by polywelding of the head portion.

BACKGROUND OF THE INVENTION

As it is known, the welding of plastic pipes useful for conveying fluids uses polywelding of the head portion among the various existing technologies.

Particular welding machines are used to perform this type of weld.

Without delving into the specific details, it is important to stress that the pipes, T-shaped unions, bends et cetera that composed the pipe, in order to be welded together, must have the same diameter and thickness and must be axially aligned with each other during welding.

Particularly for the welding of pipes for pressurized fluids and in any case for pipes having a substantial thickness, welding machines are used which have a supporting frame on which four aligned vises are fitted, such vises locking in pairs the head portions of the pipes to be welded; two mutually opposite hydraulic pusher cylinders are associated with the vises and allow the movement of said vises so as to bring the heads of the pipes to be welded into contact.

In general, the vises are sized so as to clamp a specific maximum diameter and provide the possibility to apply reduction adapters.

Each vise is constituted by two jaws articulated at one end, one jaw being fixed to the frame and one being movable; a mechanical or hydraulic closure device is present at the end that lies opposite the articulation end.

Such jaws form two mutually opposite concave portions, which are substantially semicircular and form the locking seat for the corresponding pipe to be welded.

The reduction adapters of the vise consist of substantially semicircular bodies, which in practice are C-shaped and are arranged and fixed in the complementarily shaped concave portion of a corresponding jaw.

In particular, to prevent translational motions between the jaw and the reduction adapter during welding, on the former there is a slot which accommodates a rib of the latter which is shaped complementarily with respect to said slot.

As regards the fixing of the reduction adapters, nearly all known welding machines have a radial through whole at the center of the semicircular portion, in which there is a screw which engages, with its head portion, a corresponding hole formed within the jaw.

However, this system for fixing the reduction adapter to the jaw is scarcely practical and entails a certain waste of time in preparing the welding machine.

Further, because of dirt, sometimes tightening the screw becomes difficult.

SUMMARY OF THE INVENTION

The aim of the present invention is to provide a locking vise for pipes which solves the drawbacks observed in known types.

Within this aim, an object of the present invention is to provide a locking vise for pipes which allows quick and convenient application and removal of locking reduction adapters.

Another object of the present invention is to provide a locking vise for pipes which is structurally simple and does not require the use of particular tools.

Another object of the present invention is to provide a locking vise for pipes which can be manufactured with known systems and technologies.

This aim and these and other objects, which will become better apparent hereinafter, are achieved by a locking vise for pipes, useful particularly but not exclusively in operations for welding portions of plastic pipe by polywelding of the head portion, of the type that comprises two mutually opposite jaws which form, when clamped, a circular locking seat for a portion of pipe, a slot being formed on the grip surface of each jaw in order to accommodate a corresponding portion of a body for reducing the diameter of the circular locking seat of the pipes, means for fixing to the corresponding jaw being further associated with each reduction body, characterized in that said fixing means comprise at least one locking pin, which can perform an axial translational motion and is inserted through said slot transversely thereto, said locking pin having, in the axial direction, a first part, which forms, when arranged in said slot, an undercut for preventing extraction for said reduction body, and a second part, which is recessed with respect to said first part and forms, when arranged in said slot, a disengagement configuration for the reduction body.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein.

Figure 2:
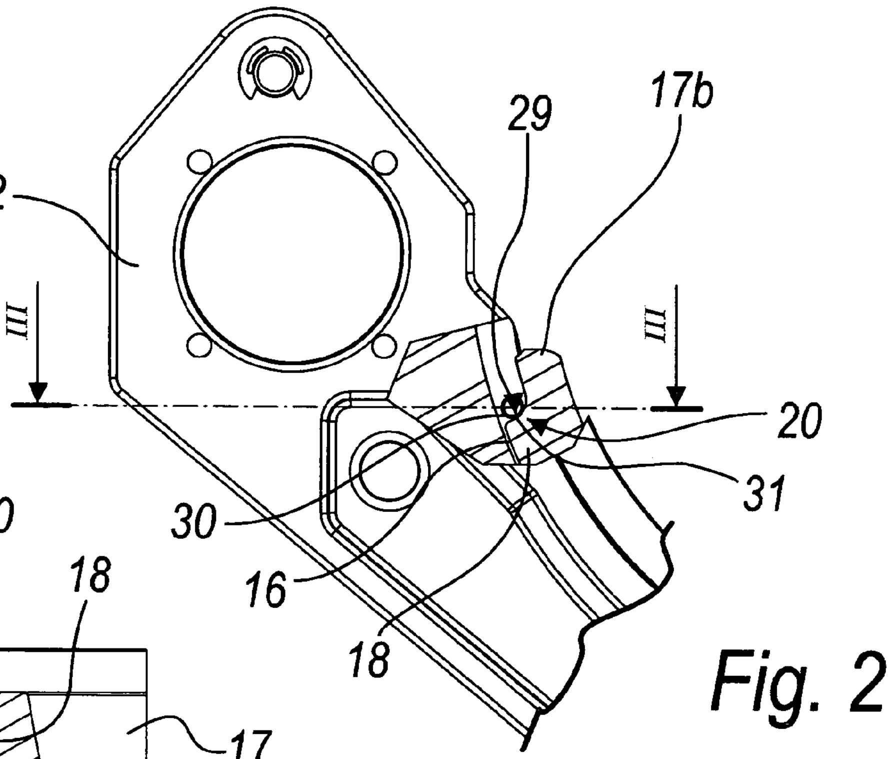
FIG. 2 is a partially sectional view of an end of a jaw of the vise of FIG. 1, with a reduction body applied thereto.
Figure 3:
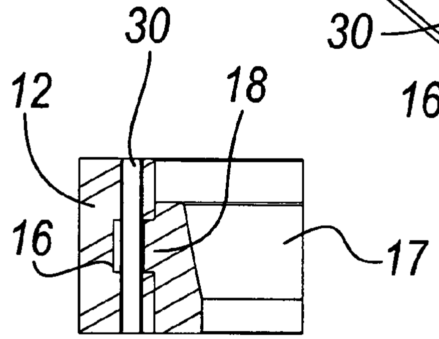
FIG. 3 is a sectional view of a detail of the end of the jaw of FIG. 2, taken along the line III-III.

It is noted that anything found to be already known during the patenting process is understood not to be claimed and to be the subject of a disclaimer.

DESCRIPTION OF THE PREFERRED EMBODIMENTS

With reference to the figures, a locking vise for pipes according to the invention is generally designated by the reference numeral 10.

The vise 10 comprises two mutually opposite jaws, respectively a first jaw 11 and a second jaw 12, which form, when clamped, a circular locking seat 13 for a portion of pipe to be welded (not shown in the figures).

The first jaw 11 is fixed to a frame, not shown in the figures, and the second jaw 12 is pivoted to the first jaw 11 by one of its ends.

The opposite ends have a locking device 14 of a per se known type.

Figure 1:
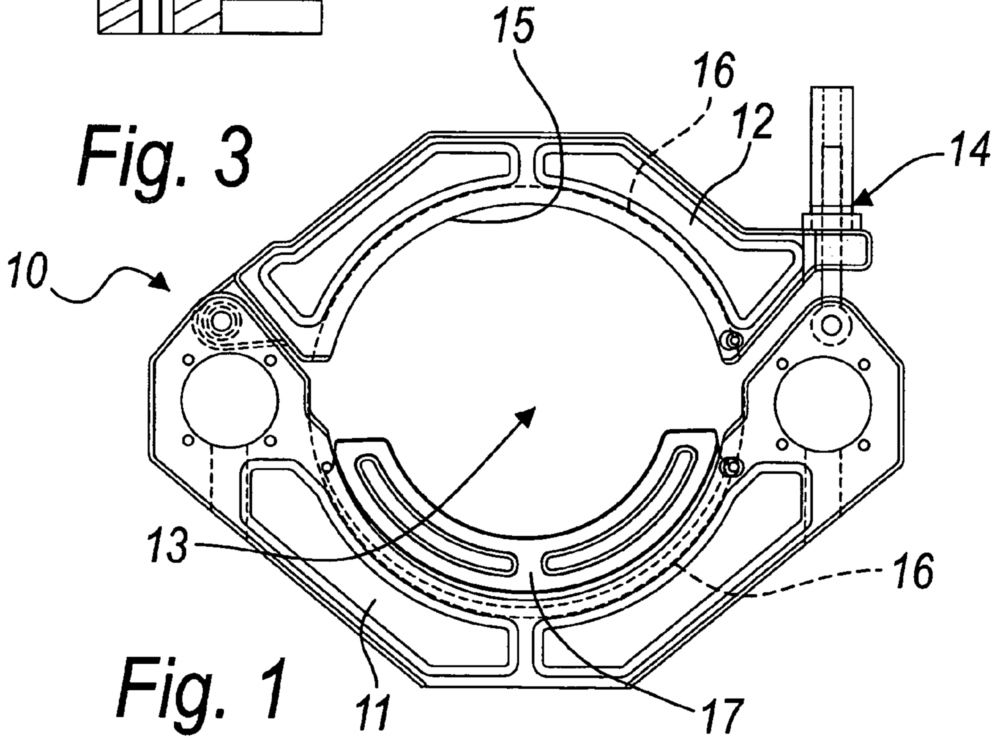
FIG. 1 is a front view of a vise according to the invention, with a single reduction body inserted therein.

A slot 16 for accommodating a corresponding portion of a body 17 for reducing the diameter of the circular locking seat 13 of the pipes is formed on the grip surface 15 of each jaw 11 or 12; FIGS. 2 to 6 illustrate only the first jaw 11, while FIG. 1 illustrates a single reduction body 17 associated with the first jaw 11.

In this embodiment, each reduction body 17 is substantially C-shaped in a longitudinal direction and has a substantially T-shaped transverse cross-section; the central rib 18 of said T-shape is shaped complementary with respect to the slot 16.

Means 20 for fixing to the corresponding jaw 11 or 12 are associated with each reduction body 17; in this embodiment, the fixing means 20 are suitable to block both ends of the reduction body 17.

In particular, the fixing means 20 comprise a locking pin 21, which can perform an axial translational motion and is inserted through the slot 16 transversely thereto, substantially proximate to a first end 17*a* of the reduction body 17.

The locking pin 21 has, in an axial direction, a first part 22 and a second part 23, whose transverse dimensions with respect to the axis of the pivot are mutually different; in practice, the second part 23 is recessed with respect to the first part 22.

In this embodiment, the first part 22 and the second part 23 that constitute the locking pin 21 are cylindrical and mutually eccentric.

Figure 4:
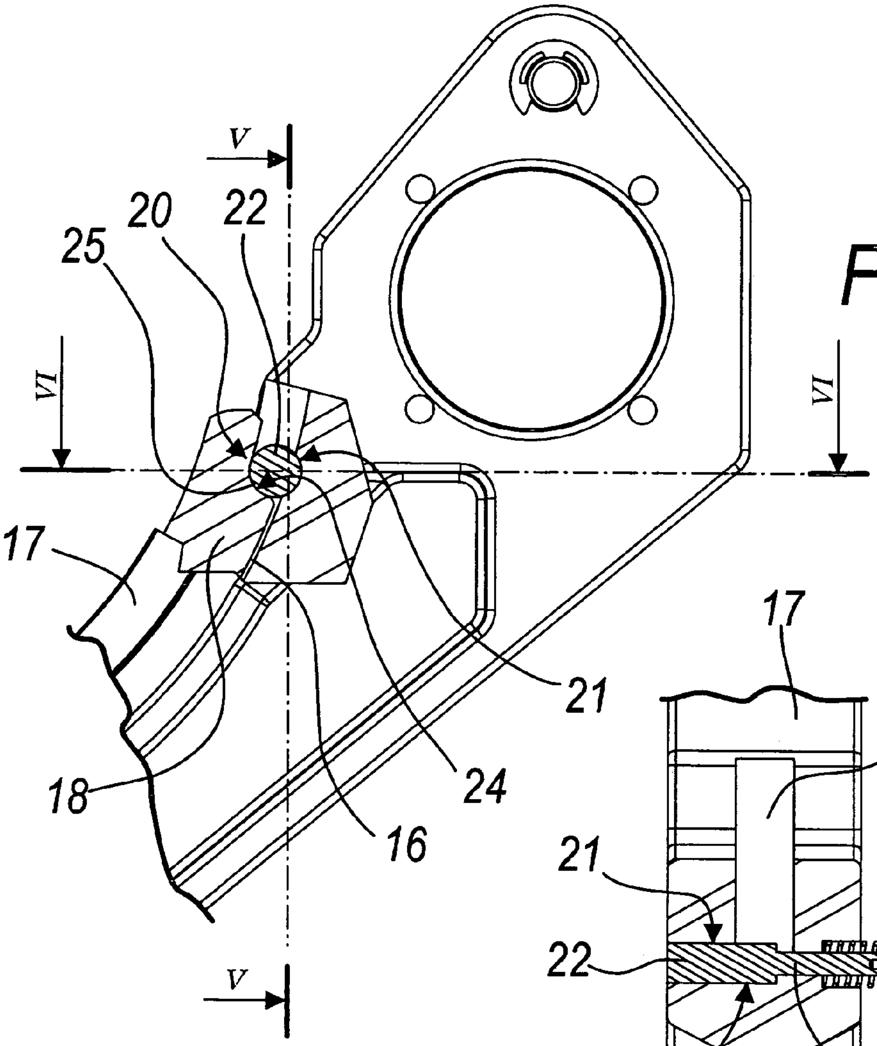
FIG. 4 is a partially sectional view of an end, which lies opposite the end of FIG. 2, of a jaw of the vise of FIG. 1, with a reduction body applied thereto.
Figure 5:
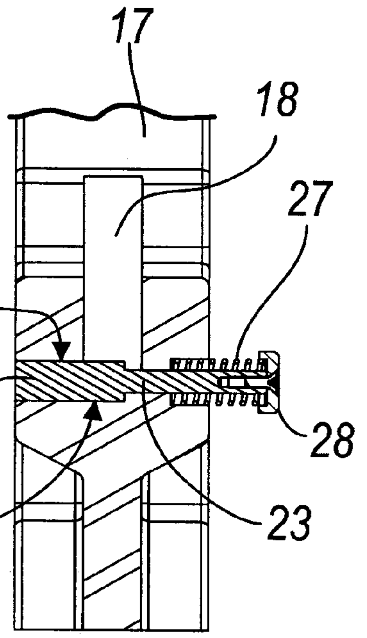
FIG. 5 is a sectional view of a detail of the end of the jaw of FIG. 4, taken along the line V-V.
Figure 6:
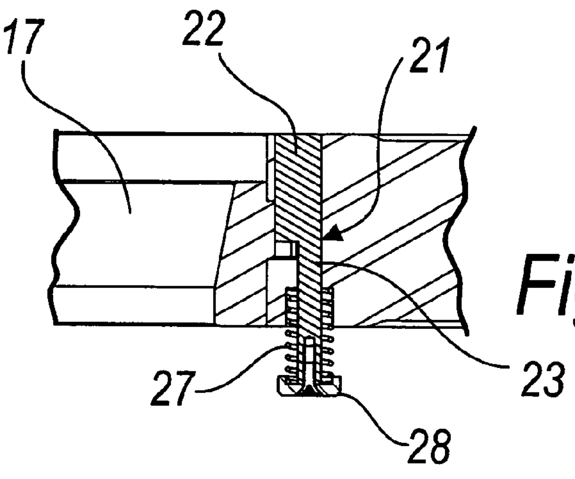
FIG. 6 is a sectional view of a detail of the end of the jaw of FIG. 4, taken along the line VI-VI.

The first part 22, when positioned in the slot 16, forms an undercut 24 for preventing extraction of the reduction body 17, as clearly shown in FIGS. 4, 5 and 6.

Figure 7:
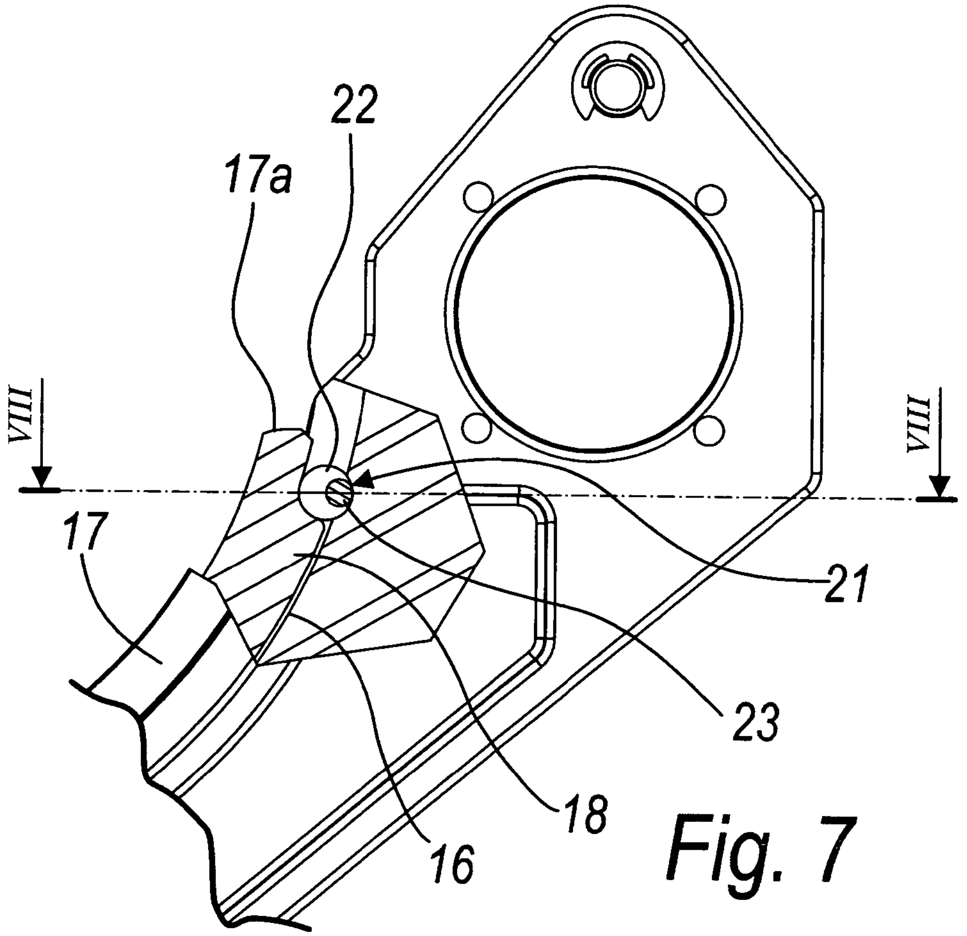
FIG. 7 is a view of the end of the jaw of FIG. 4, with the reduction body applied thereto in disengagement configuration.
Figure 8:
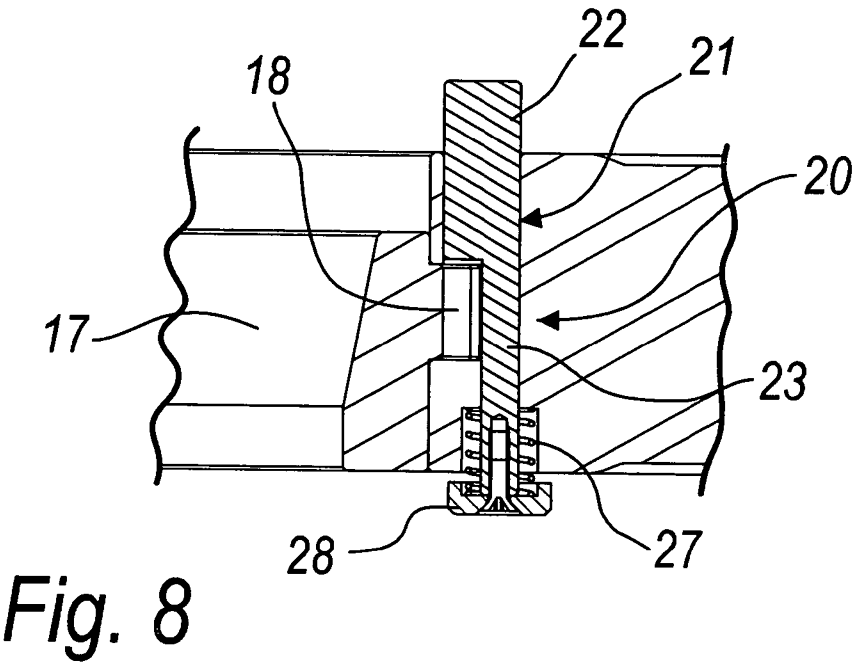
FIG. 8 is a sectional view of a detail of the end of the jaw of FIG. 7 taken along the line VIII-VIII.

As mentioned, the second part 23 is recessed with respect to the first part 22, and when arranged in the slot 16 forms a disengagement configuration for the reduction body 17, as clearly shown in FIGS. 7 and 8.

In particular, in this described embodiment, at the first end 17*a* of the reduction body 17 the central rib 18 of said body is recessed, forming a concave portion 25 to be mated laterally with the locking pin 21.

The first part 22 is shaped substantially complementarily with respect to the concave portion 25 formed at the end of the rib 18.

Advantageously, an elastic element 27 is associated with the locking pin 21 and acts between the locking pin 21 and the first jaw 11; said element is, for example, a helical spring, which is arranged coaxially to the second part 23 of the locking pin 21 and is comprised between a disk 28, which is fixed to the free end of the second part 23, and the bottom of a cylindrical cavity, which is formed on the side of the first jaw 11.

The elastic element 27 is suitable to keep the locking pin 21 in the configuration for preventing extraction, in which the first part 22 of the pin 21 forms the undercut 24 in the slot 16.

One end of the locking pin 21 is available to a user in order to perform a pushing action which brings the second part 23 of the pin 21 into the slot 16, so as to free the reduction body 17; in particular, the end of the pin 21 corresponds to the disk 28, which in practice acts as a pushbutton for releasing the fixing of the reduction body 17 to the jaw.

The means 20 for fixing the reduction body 17 to the corresponding jaw 11 or 12 further comprise, substantially at the second end 17*b* of the reduction body 17, an additional undercut portion 29 with respect to the direction of extraction of the reduction body 17 which is formed in the slot 16; a corresponding portion of the second end 17*b* of the reduction body 17 can be inserted in the additional undercut portion 29.

In particular, in this embodiment, the additional undercut portion 29 is formed by a locking pin 30, which is inserted through the slot 16 transversely thereto.

The second end 17*b* of the reduction body 17 is also recessed, so as to form an additional concave portion 31 to be mated laterally with respect to the locking pin 30.

The operation of the locking vise of the invention is as follows.

If it is necessary to associate respective reduction bodies with the jaws of the vise, the second end 17*b* of the reduction body is inserted in the slot 16 for each jaw, so as to mate the additional concave portion 31 with the pin 30.

Then, by using the pin 30 as a pivot, the reduction body 17 is turned, moving the first end 17*a* toward the locking pin 21.

By pressing the disk 28 toward the jaw, such locking pin is retained so that the second part 23 is arranged in the slot 16, so as to allow the insertion of the rib 18 in the slot 16.

Once the first end 17*a* has been inserted in the slot 16, the disk 28 is released, and consequently the elastic element produces the translational motion of the pin 18 until the first part 22 is brought into the slot 16, locking the reduction body.

The reverse operations are performed in order to remove the reduction body.

In practice it has been found that the invention thus described solves the problems noted in known types of locking vise for pipes; in particular, the present invention provides a locking vise for pipes which allows quick and convenient application and removal of locking reduction adapters.

Further, the invention provides a locking vise for pipes which does not require particular tools for removing or inserting locking reduction adapters.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2005A000216 from which this application claims priority are incorporated herein by reference.

What is claimed is:

1. A locking vise for pipes, useful in operations for welding portions of plastic pipe by polywelding of a head portion of the plastic pipe, comprising:

two mutually opposite jaws which form, when clamped, a circular locking seat for a portion of pipe, a slot being formed on a surface of each jaw in order to accommodate a corresponding portion of a reduction body for reducing a diameter of the circular locking seat of the pipes, said reduction body being substantially C-shaped in a longitudinal direction thereof, and said reduction body having a first end and a second end, means for fixing said first and second ends of said reduction body to a corresponding one of said jaws being further associated with each reduction body, said fixing means comprising a first locking pin at said first end of said reduction body, which can perform an axial translational motion and is inserted through said slot transversely to said slot at a first end of said slot, said first locking pin having, in an axial direction, a first part, which forms, when arranged in said slot at said first end thereof, an undercut for preventing extraction for said reduction body, and a second part, which is recessed with respect to said first part and forms, when arranged in said slot at said first end thereof, a disengagement configuration for the reduction body, said fixing means further comprising a second locking pin at said second end of said reduction body and inserted through said slot transversely thereto and at a second end of said slot.

2. The vise of claim 1, wherein said reduction body has a substantially T-shaped cross-section, a central rib of said T-shape being shaped complementarily with respect to said slot, said central rib being recessed proximate to said first end of said reduction body to be associated with said first locking pin, forming a concave portion to be mated laterally to said first locking pin, said first and second parts that constitute said first locking pin being cylindrical and mutually eccentric, said first part being shaped substantially complementarily to said concave portion.

3. The vise of claim 1, wherein an elastic element is associated with said first locking pin and acts between said first locking pin and said corresponding jaw, and is suitable to keep said first locking pin in the configuration for preventing extraction, with said first part so as to form said undercut in said slot, one end of said locking pin being available to a user in order to perform a pushing action which moves the second part of the pin into said slot so as to release the reduction body.

4. The vise of claim 1, wherein an additional undercut portion with respect to the direction of extraction of the reduction body is formed at said second end of said slot, a corresponding portion of the second end of the reduction body being insertable therein.

5. A locking vise for pipes, useful in operations for welding portions of plastic pipe by polywelding of a head portion of the plastic pipe, comprising:

two mutually opposite jaws which form, when clamped, a circular locking seat for a portion of pipe, a slot being formed on a surface of each jaw in order to accommodate a corresponding portion of a reduction body for reducing a diameter of the circular locking seat of the pipes, means for fixing to a corresponding one of said jaws being further associated with each reduction body, said fixing means comprising at least one locking pin, which can perform an axial translational motion and is inserted through said slot transversely to said slot, said looking pin having, in an axial direction, a first part, which forms, when arranged in said slot, an undercut for preventing extraction for said reduction body, and a second part, which is recessed with respect to said first part and forms, when arranged in said slot, a disengagement configuration for the reduction body, an elastic element being associated with said locking pin acting between said locking pin and said corresponding jaw, and being suitable to keep said locking pin in the configuration for preventing extraction, with said first part so as to form said undercut in said slot, one end of said locking pin being available to a user in order to perform a pushing action which moves the second part of the pin into said slot so as to release the reduction body, said elastic element is being constituted by a helical spring, which is arranged coaxially to said second part of said locking pin and is comprised between a disk, which is fixed to a free end of said second part, and a bottom of a cylindrical cavity, which is formed in a side of said corresponding jaw.

6. A locking vise for pipes, useful in operations for welding portions of plastic pipe by polywelding of a head portion of the plastic pipe, comprising;

two mutually opposite jaws which form, when clamped, a circular locking seat for a portion of pipe, a slot being formed on a surface of each jaw in order to accommodate a corresponding portion of a reduction body for reducing a diameter of the circular locking seat of the pipes, means for fixing to a corresponding one of said jaws being further associated with each reduction body, said fixing means comprising a first locking pin, which can perform an axial translational motion and is inserted through said slot transversely to said slot said first locking pin having, in an axial direction, a first part, which forms, when arranged in said slot, an undercut for preventing extraction for said reduction body, and a second part, which is recessed with respect to said first part and forms, when arranged in said slot a disengagement configuration, for the reduction body, said reduction body being substantially C-shaped in a longitudinal direction and said fixing means being suitable to lock both ends of said reduction body, said first locking pin being associated with a first end, an additional undercut portion with respect to the direction of extraction of the reduction body being formed at a second end, a corresponding portion of the second end of the reduction body being insertable therein, said additional undercut portion being formed by a second locking pin, which is inserted through said slot transversely thereto, said second end of said reduction body being recessed and forming an additional concave portion to be mated laterally to said second locking pin.

* * * * *